US011993905B2

(12) United States Patent
Jones, Sr.

(10) Patent No.: US 11,993,905 B2
(45) Date of Patent: May 28, 2024

(54) MODULAR HEATED SURFACE SYSTEM AND METHOD OF INSTALLATION

(71) Applicant: Robinson Investment Group, LLC, Cape Girardeau, MO (US)

(72) Inventor: Terence Jones, Sr., Kansas City, MO (US)

( * ) Notice: Subject to any disclaimer, the term of this patent is extended or adjusted under 35 U.S.C. 154(b) by 855 days.

(21) Appl. No.: 17/104,756

(22) Filed: Nov. 25, 2020

(65) Prior Publication Data

US 2021/0079613 A1 Mar. 18, 2021

Related U.S. Application Data

(63) Continuation-in-part of application No. 15/710,623, filed on Sep. 20, 2017, now abandoned.

(51) Int. Cl.

| | |
|---|---|
| ***E01H 5/10*** | (2006.01) |
| ***H05B 1/02*** | (2006.01) |
| ***H05B 3/20*** | (2006.01) |

(52) U.S. Cl.

CPC ........... *E01H 5/108* (2013.01); *H05B 1/0252* (2013.01); *H05B 3/20* (2013.01); *H05B 1/0225* (2013.01)

(58) Field of Classification Search

CPC ........ B01J 20/18; B01J 20/3057; B01J 29/70; B01J 35/02; B01J 37/038; C01B 39/48; C01P 2002/72; E01C 11/265; E01C 2201/12; E01C 2201/14; E01C 5/00; E01C 9/08; E04B 1/6137; F25D 21/14; H05B 3/22

USPC ....... 219/213, 528, 548, 549, 541, 543, 217, 219/432, 497, 535, 546, 547; 392/379, 392/432, 436, 437; 237/1 R; 165/170, 165/45; 404/35, 41, 2, 34, 36, 50, 79

See application file for complete search history.

(56) References Cited

U.S. PATENT DOCUMENTS

| | | | | |
|---|---|---|---|---|
| 5,614,292 | A | 3/1997 | Saylor | |
| 6,041,556 | A | 3/2000 | Keller | |
| 2005/0254802 | A1 | 11/2005 | Shields | |
| 2006/0054209 | A1 * | 3/2006 | Hulen | B60M 7/00 136/205 |

* cited by examiner

*Primary Examiner* — Vy T Nguyen

(74) *Attorney, Agent, or Firm* — Law Office of Mark Brown, LLC; Christopher M DeBacker

(57) ABSTRACT

A modular heated surface system which can quickly be assembled from several pieces. The system can be designed to fit sidewalks and driveways of any size and includes durable surfaces for driving vehicles across the platforms. A drain assembly is included to ensure that the water produced from melted ice and snow is properly drained away from the heated surface. The system is powered by plugging the system into a standard 120V outlet.

12 Claims, 13 Drawing Sheets

MODULAR HEATED SURFACE SYSTEM AND METHOD OF INSTALLATION

CROSS-REFERENCE TO RELATED APPLICATION

This application is a continuation-in-part of, and claims priority in U.S. patent application Ser. No. 15/710,623 filed Sep. 20, 2017, now U.S. Application Pub. No. 2019/0090313, which is incorporated herein by reference.

BACKGROUND OF THE INVENTION

1. Field of the Invention

The present invention relates generally to a heated surface system and method for use thereof, and more specifically to a modular heated surface system using standard electrical power for heating elements and including drain elements for temporary or semi-permanent use.

2. Description of the Related Art

Typical driveway and sidewalk heating elements are expensive and require the heating elements to be installed directly into or below a concrete slab or other driveway or sidewalk material. This causes a high bar for someone to obtain heating elements for heating their sidewalks and driveways. Other problems exist with these systems, as areas that are not adequately heated may cause draining water to freeze. Drainage in general can be a major problem with such permanent installations. What is needed is an affordable and easily portable heating element system for sidewalks and driveways.

Heretofore there has not been available a system or method for a modular heated surface system with the advantages and features of the present invention.

BRIEF SUMMARY OF THE INVENTION

The present invention generally provides a modular heated surface system which can quickly be assembled from several pieces. The system can be designed to fit sidewalks and driveways of any size and includes durable surfaces for driving vehicles across the platforms. A drain assembly is included to ensure that the water produced from melted ice and snow is properly drained away from the heated surface. The system is powered by plugging the system into a standard 120V outlet.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Heated Surface System 2

Figure 1:
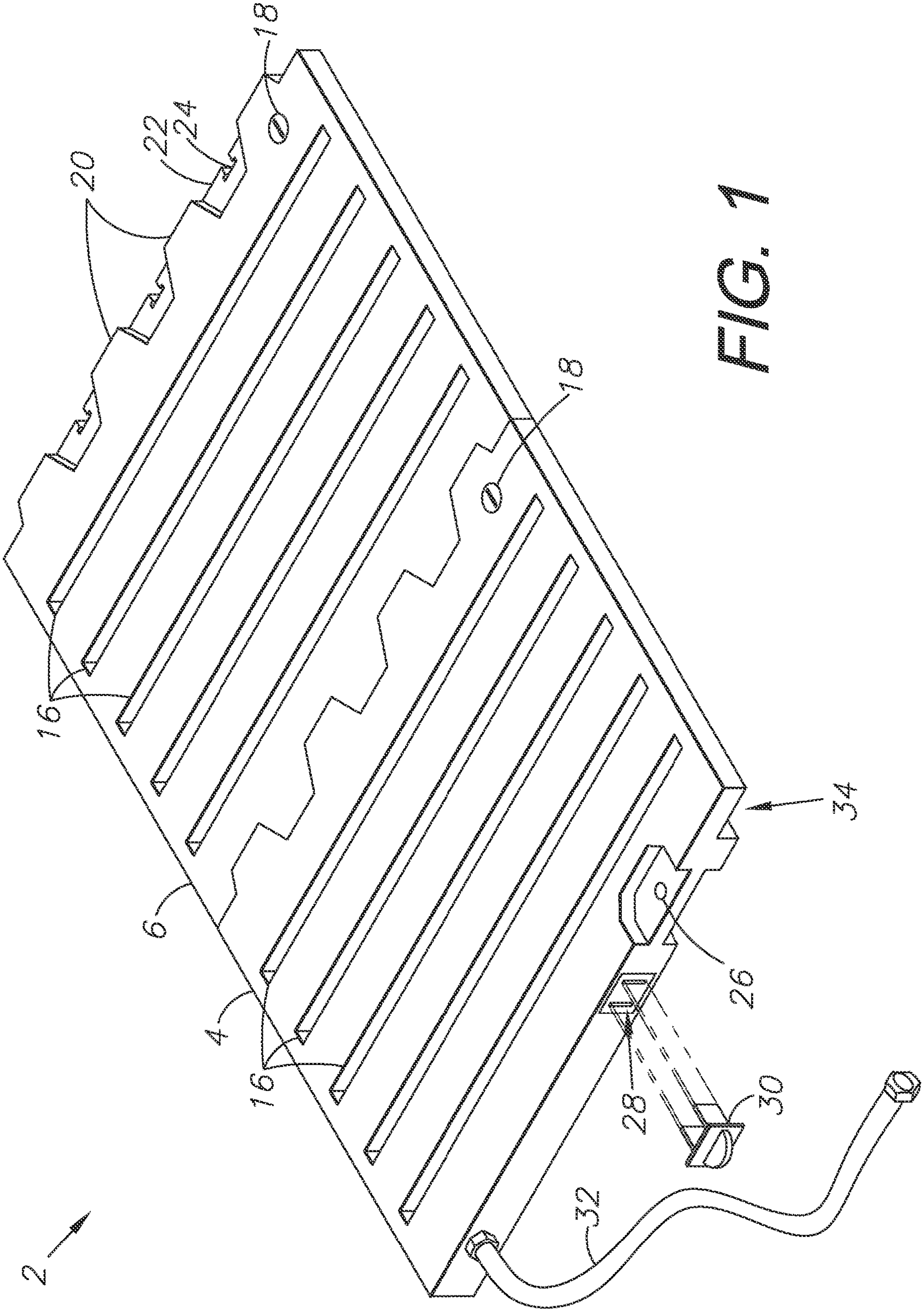
FIG. 1 is three-dimensional isometric view of a portion of a preferred embodiment of the present invention.

Referring to the figures in more detail, FIG. 1 shows a first panel 4 and a second panel 6 joined together to form a portion of a heated surface system 2. The first panel 4 would form the lower-left corner of the entire system and portrayed in FIG. 9. One edge of the first panel 4 includes connections for a drain hose 32 and an electrical outlet 28 and outlet cover 30 which allows the system to receive electrical power to heat up coils 50 within the panels 4, 6. The edge of the first panel 4 also includes a cable lock 26 for securing the system 2 to a cable for security purposes. A cable or other securing device can be connected to the cable lock to secure the entire assembly. Other panels shown in FIGS. 2-7 show different panel types which all join together to form the heated surface system 2.

Figure 9:
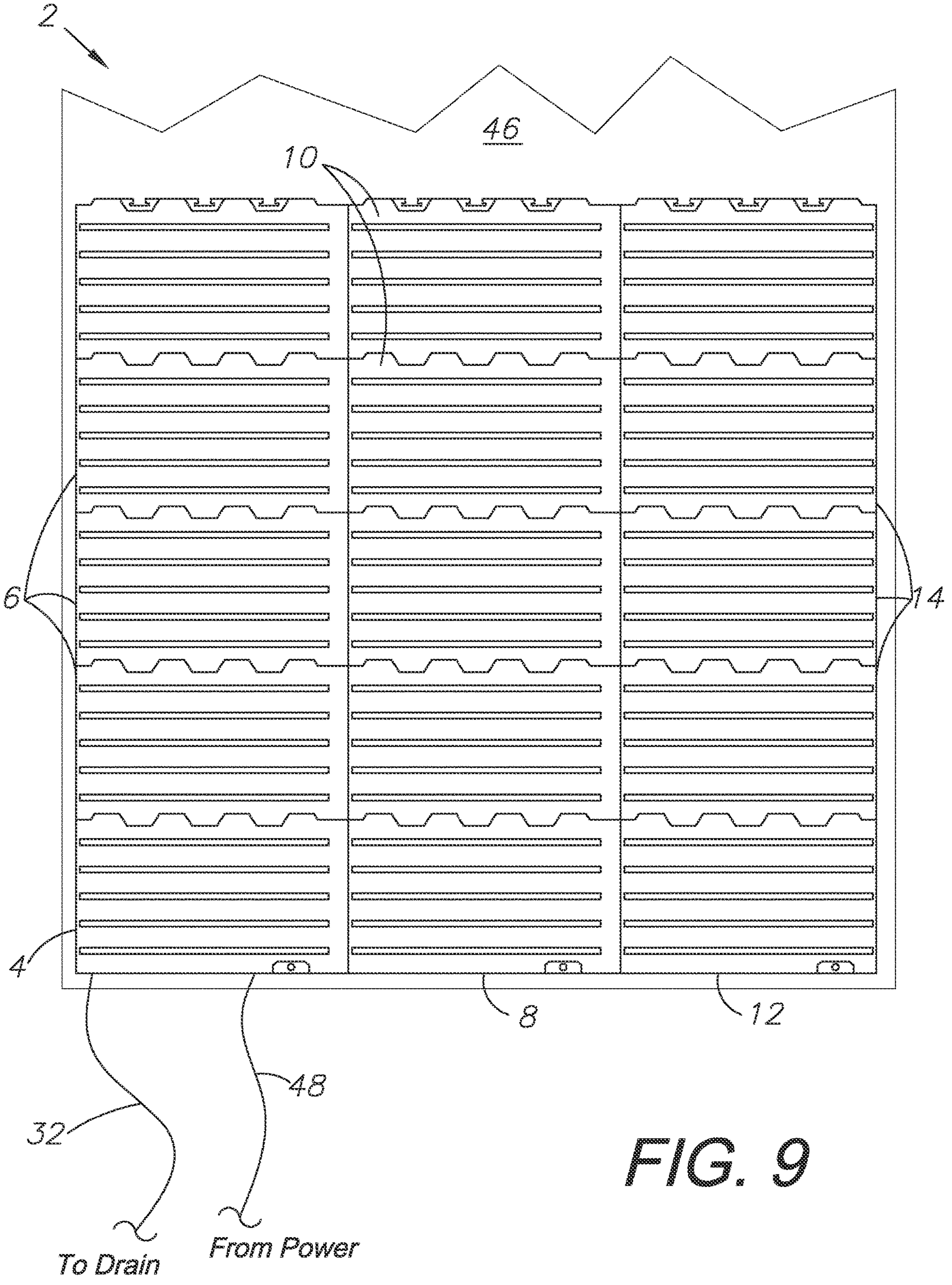
FIG. 9 is a top plan view of a preferred embodiment of the present invention.

Each panel 4, 6, 8, 10, 12, 14, includes at least one edge which contains interlocking teeth 20, 22. The top tooth 20 fits over the bottom tooth 22, and a slot 24 within the bottom tooth 22 receives a tab 44 located on the bottom face of the top tooth 20. This allows the panels to be quickly and easily joined together in any configuration necessary to cover a surface, such as a driveway 46 as shown in FIG. 9.

As shown in FIG. 1, the first 4 and second 6 panels are joined by the interlocking teeth 22, 24 and are locked into place using a locking element which can be released or locked using the lock 18. A special tool or key could be used to activate the lock 18.

Figure 2:
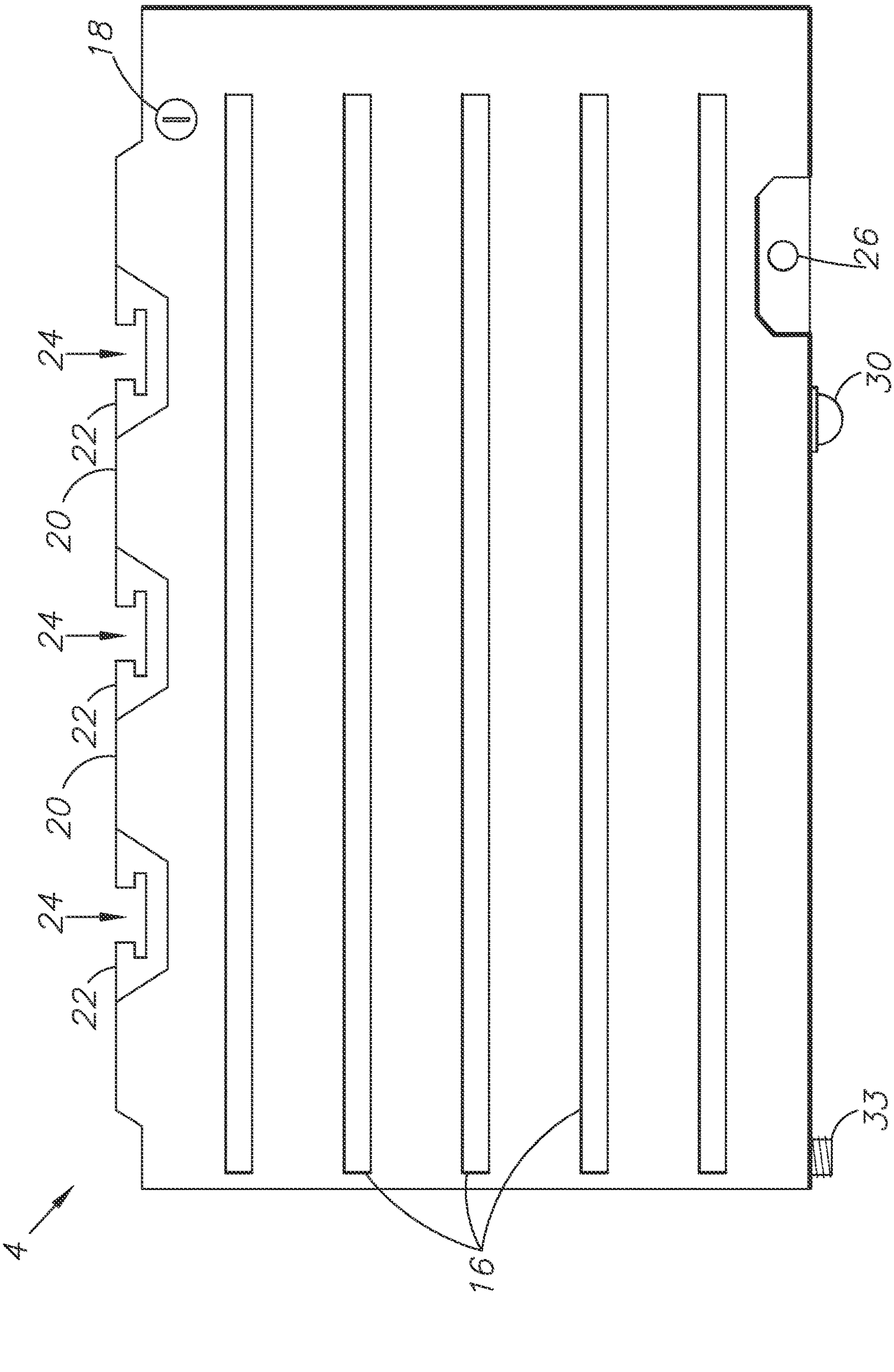
FIG. 2 is a top plan view of a first panel element used in a preferred embodiment of the present invention.

FIG. 2 shows the top face of the first panel 4 as shown in FIG. 1, including the drain strips 16 which receive melted ice and snow from above the panel 4 and drain it back towards the left edge, which then drains into a drain line ultimately leading to the spout 33 which connects to the drain hose 32, which removes the water from the area. The top edge of the first panel 4 as shown in FIG. 2 includes the interlocking teeth 22, 24, and the right edge includes an upper lip 34 for engaging a lower lip of an adjacent panel, which is shown in more detail in FIG. 10. The drain strips 16 also provide traction for vehicle tires.

Figure 3:
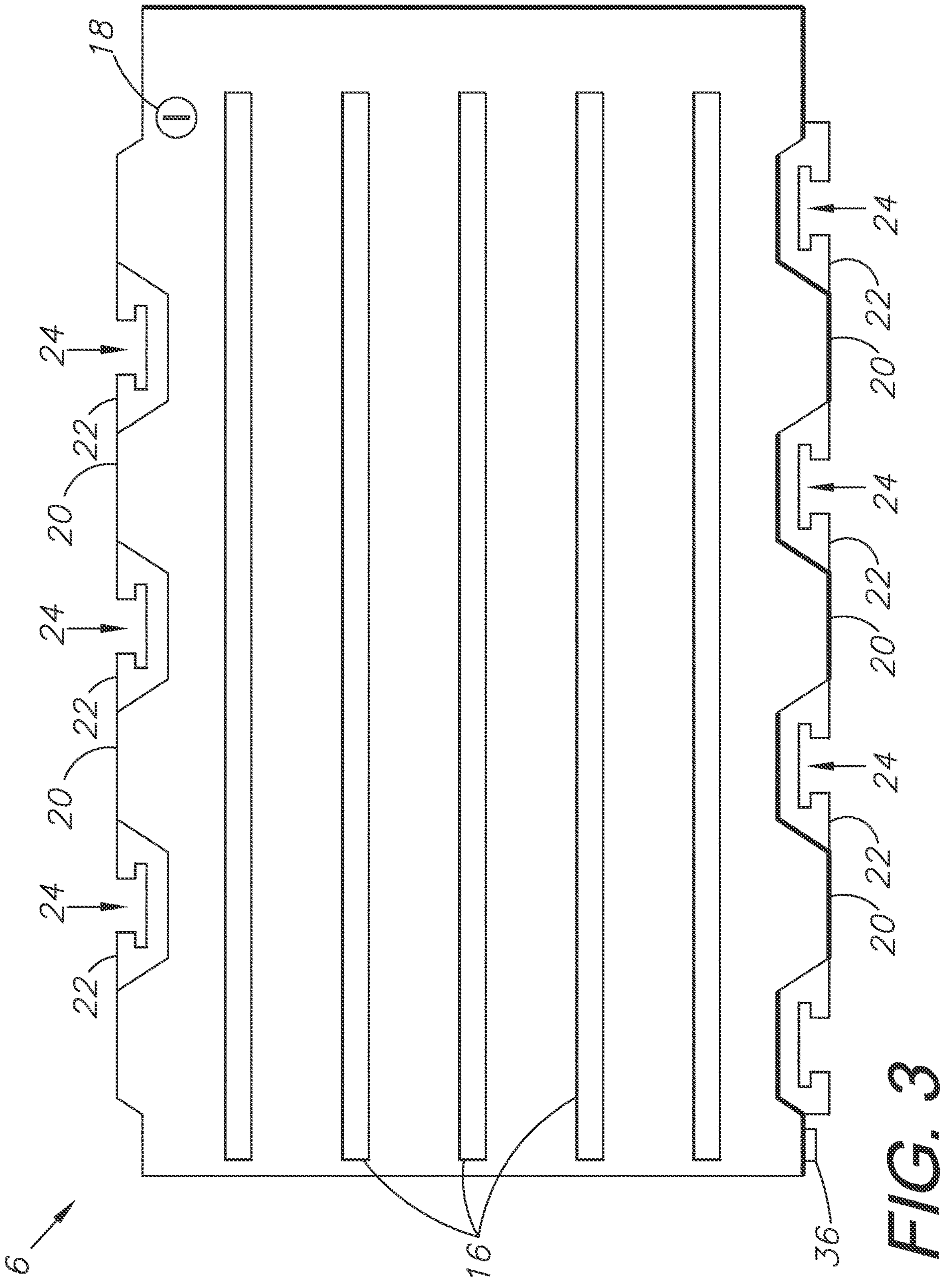
FIG. 3 is a top plan view of a second panel element used in a preferred embodiment of the present invention.

Similarly, FIG. 3 shows a top face of the second panel 6 as shown in FIG. 1, including a drain connector 36 for connecting with the drain line running through the left edge of the first panel 4. Interlocking teeth 22, 24 are shown on the top and bottom edges of this panel. Similarly, like the first panel 4, the right edge includes a top lip and the left edge is squared off.

Figure 4:
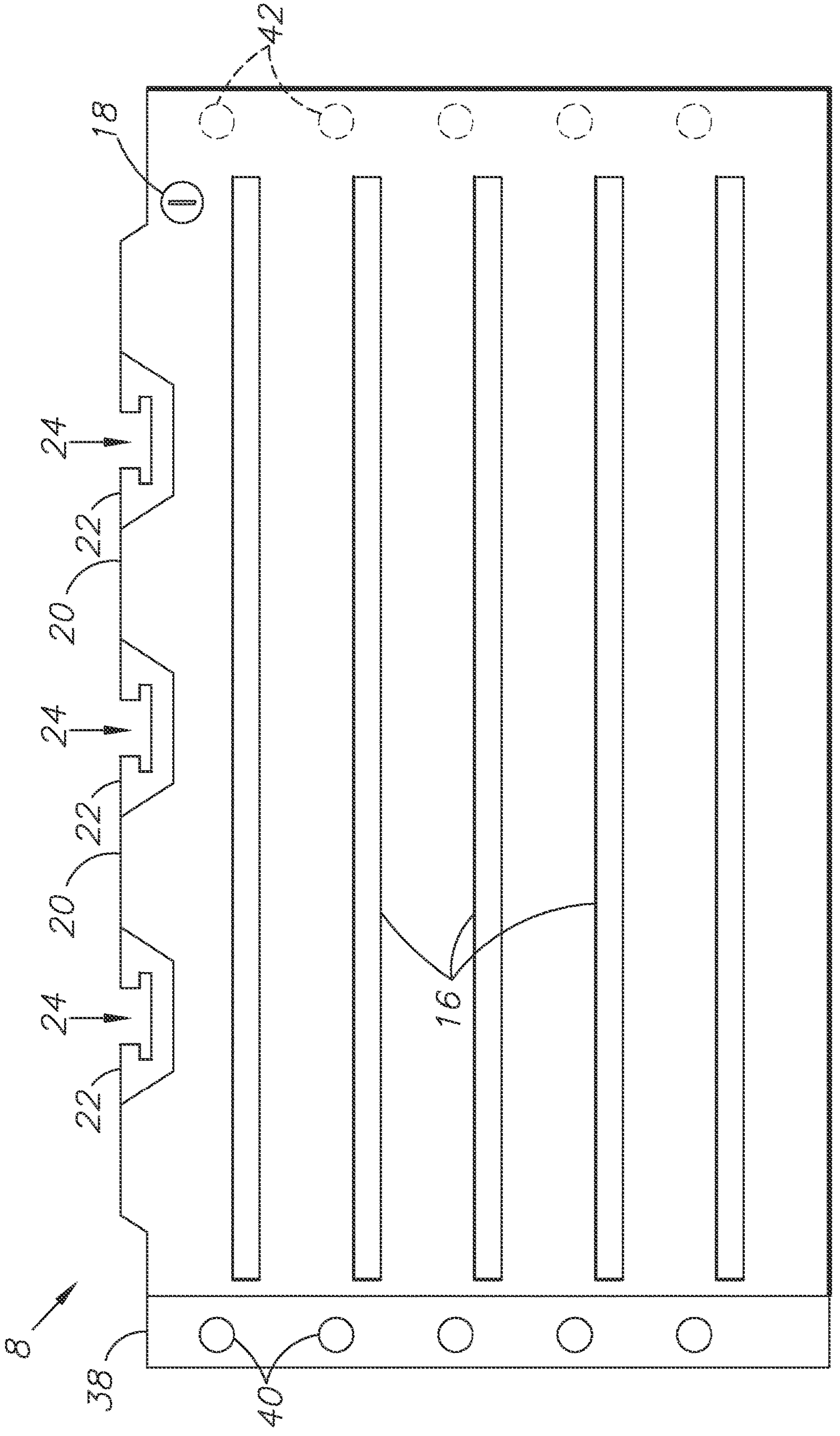
FIG. 4 is a top plan view of a third panel element used in a preferred embodiment of the present invention.

FIG. 4 shows a third panel 8 which would connect next to the first panel 4 in the layout shown in FIG. 9. The lower lip 38 of the third panel 8 would interlock with the upper lip 34 of the first panel 4. The lower lip 38 has receivers 40 for receiving nodules 42 connected to the lower face of the upper lip 34. These interlock to hold the panels together, and may even be used to transmit power from the first panel horizontally across the system 2 as laid out in FIG. 9, or to provide drain access laterally. The third panel 8 has a squared bottom edge as shown in FIG. 4, and interlocking teeth 22, 24 on the upper edge. An upper lip 34 connection is on the right edge.

Figure 5:
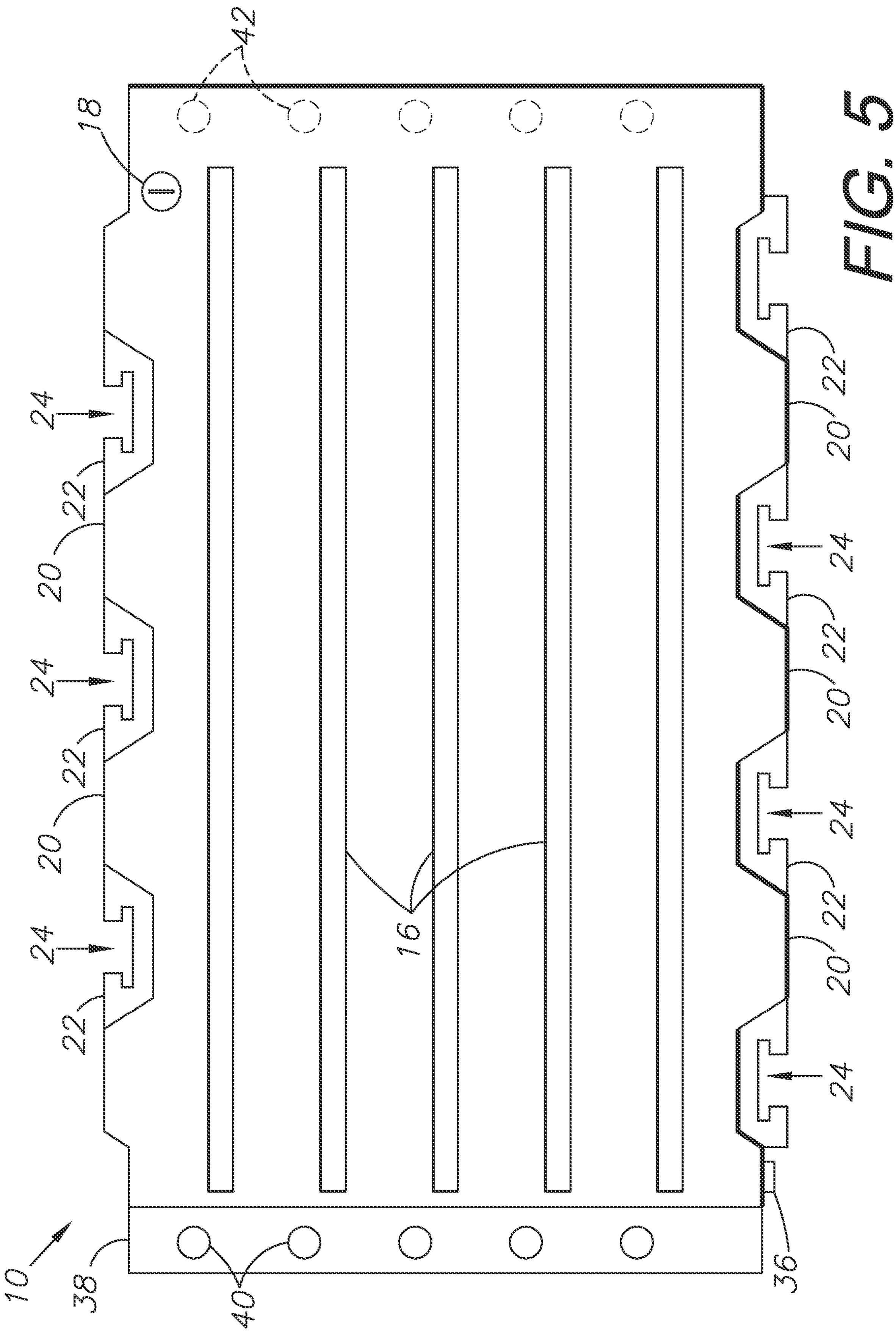
FIG. 5 is a top plan view of a fourth panel element used in a preferred embodiment of the present invention.

FIG. 5 shows a fourth panel 10 which has interlocking teeth 22, 24 along both its upper and lower edges. Similar to the third panel 8, this fourth panel 10 includes a lower lip 38 and connection receivers 40 along its left edge, and an upper lip 34 with nodules 40 along its right edge. The fourth panel 10 would connect to the right edge of the second panel 6.

Figure 6:
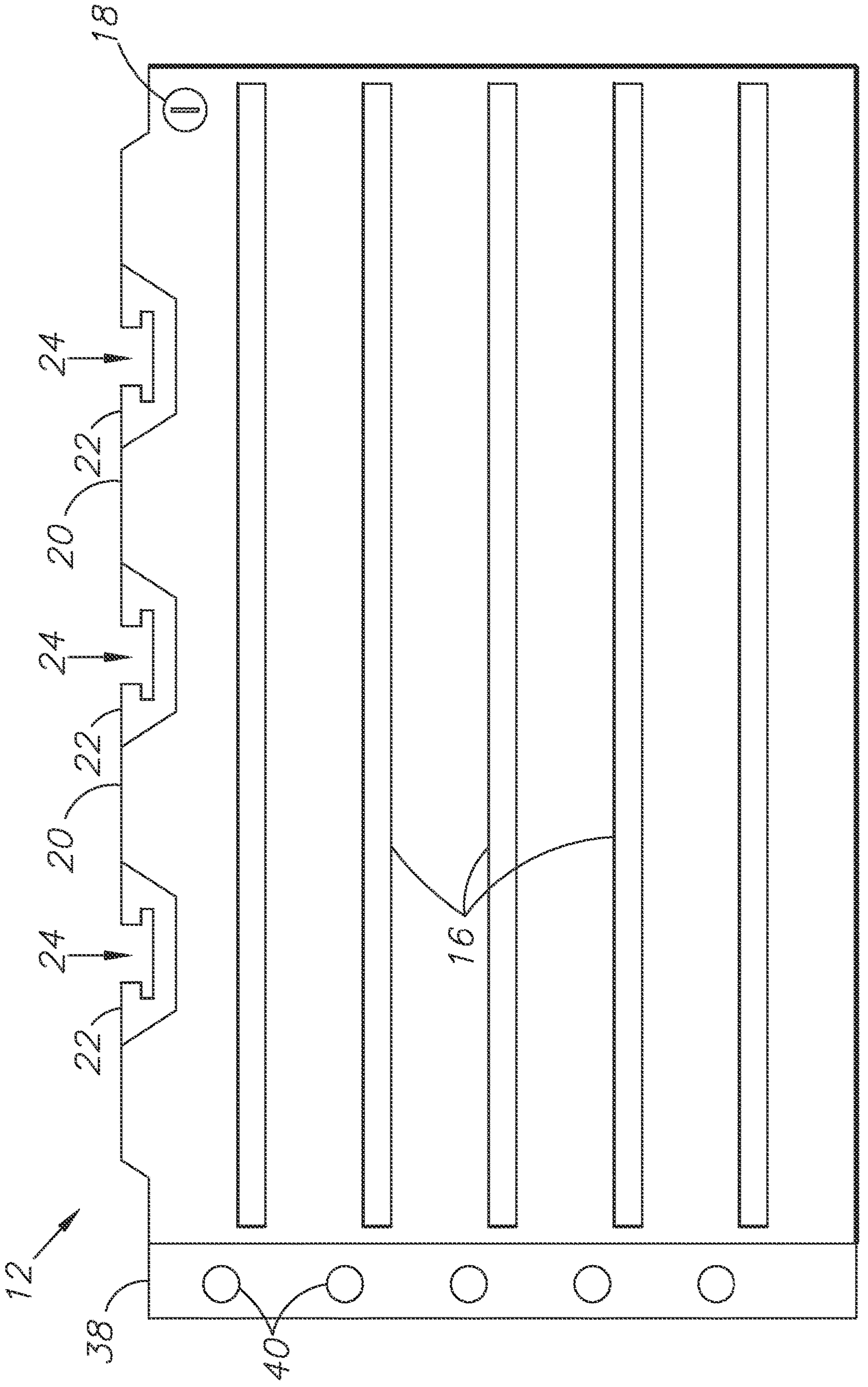
FIG. 6 is a top plan view of a fifth panel element used in a preferred embodiment of the present invention.

FIG. 6 shows a fifth panel 12 which has interlocking teeth 22, 24 along its upper edge, but has a squared lower edge. The left edge includes the lower lip 38 and receivers 40 for interlocking with the third panel 8; however, the right edge is squared and does not include a lip. This allows the fourth panel to be the bottom right panel in the layout shown in FIG. 9. Alternatively, to save from having so many different types of panels, the fifth panel could be replaced by the third panel 8.

Figure 7:
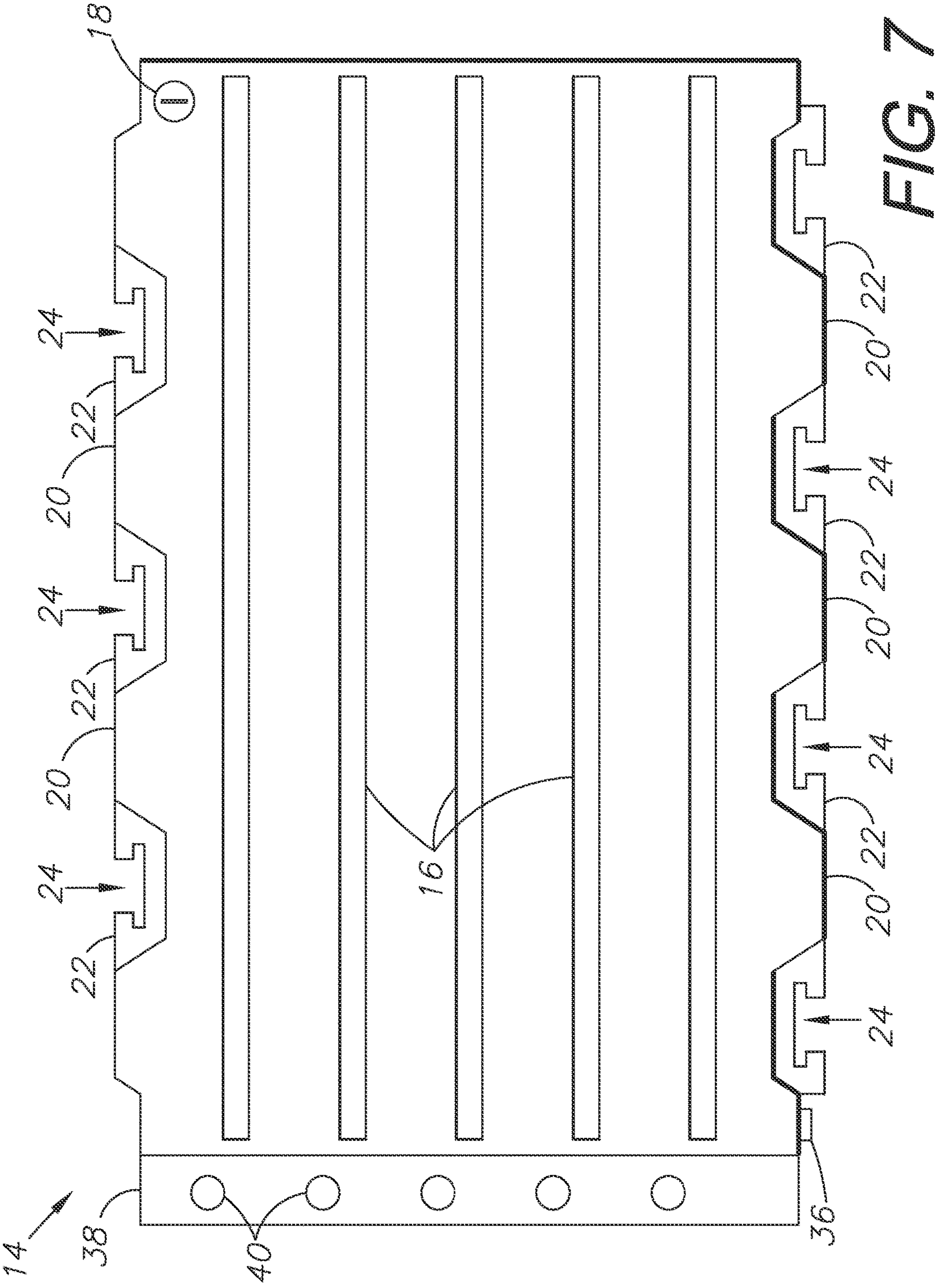
FIG. 7 is a top plan view of a sixth panel element used in a preferred embodiment of the present invention.

Similarly, FIG. 7 shows a sixth panel 14 which has interlocking teeth 22, 24 on both its upper and lower edges, a lower left lip 38 with receivers 40, and a squared right edge. The sixth panel would connect to a fourth panel, or could alternatively be replaced with a fourth panel to save on the variety of panel types.

Figure 8:
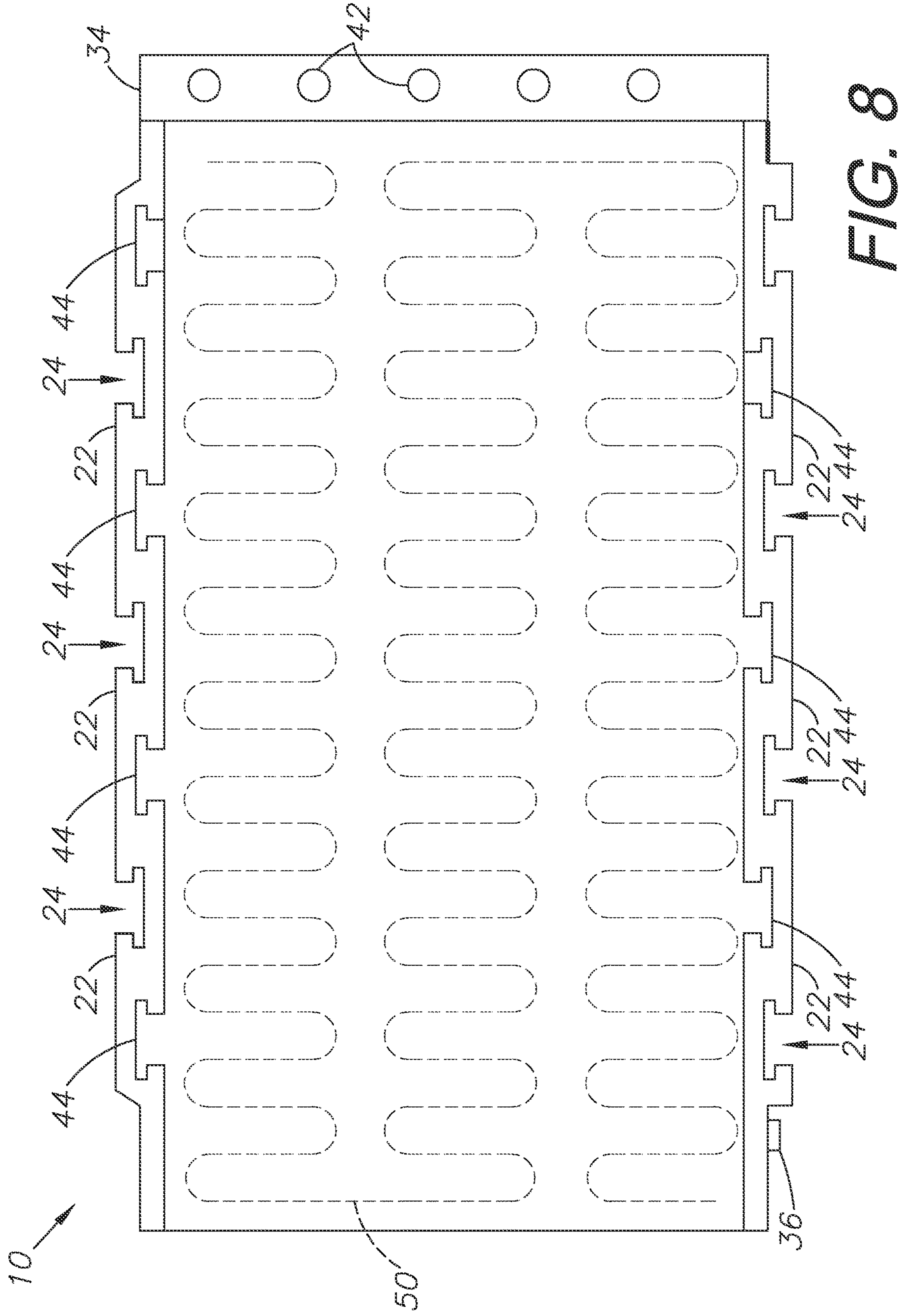
FIG. 8 is a bottom plan view of the embodiment of FIG. 5.

FIG. 8 shows a bottom plan view of the underside of the fourth panel 10, and includes the internal heat coil 50 which is used to heat the panel to melt snow and ice on the top of the panel. Also shown here are the tabs 44 located on the bottom faces of the top interlocking teeth 20. The coil 50 could be wire which heats using electrical resistance, or could be tubing with heated water, or any other suitable heating element. Power for the heating coil 50 is optimally received at the outlet port 28 of the first panel 4.

FIG. 9 shows a driveway 46 with the heated surface system 2 deployed on top of it. The driveway could also be a sidewalk or any other flat surface which is susceptible to snow and ice accumulation. The first 4, second 6, third 8, fourth 10, fifth 12, and sixth 14 panels are all interlocked using the interlocking teeth 22, 24 and interlocking lips 34, 38. Power is received from a power source connected to the first panel with a power cable 48. Melted ice and snow forms water which drains to the drain tube 32 and away to a drain location.

Figure 10:
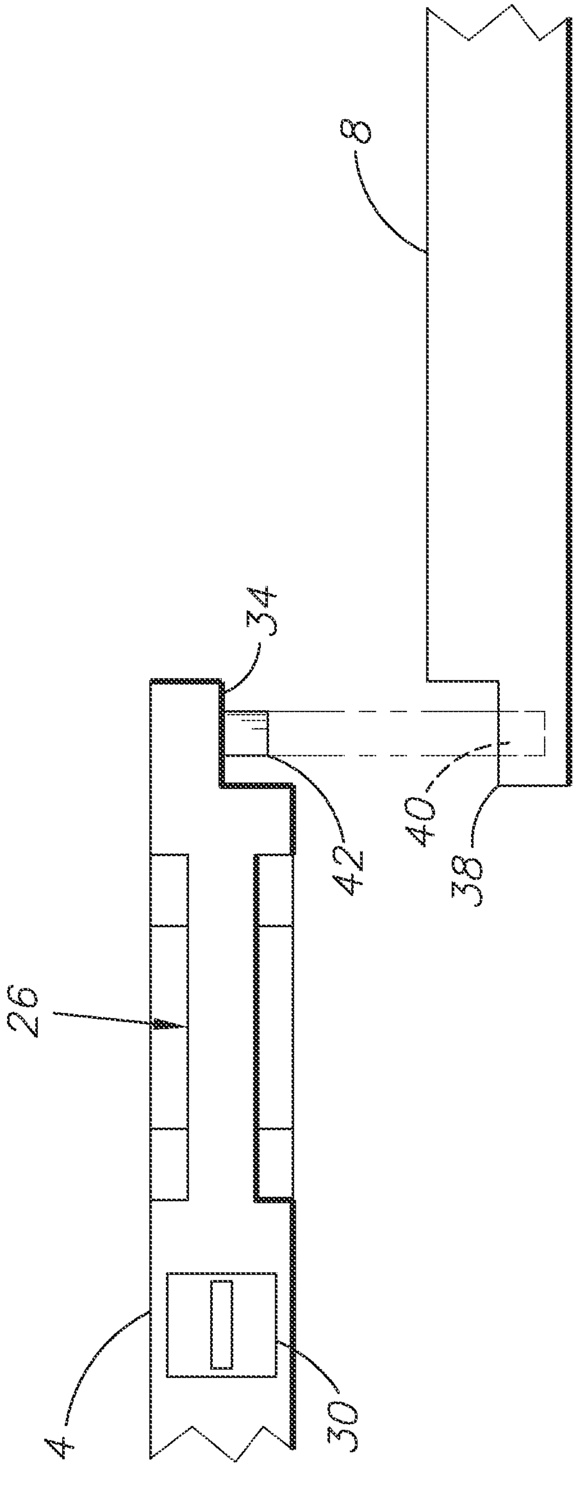
FIG. 10 is a side elevational view of two elements of the preferred embodiment thereof shown in a disconnected orientation.

FIG. 10 shows how the first panel 4 is joined to the third panel 8 using the upper lip 34 and lower lip 38 connection, where the nodule 42 of the upper lip 34 is received within the receiver holes 40 of the lower lip. This forms the horizontal connections shown in FIG. 9, as opposed to the vertical connections which are formed using the interlocking teeth. It should be understood that other connection types could be used, including interlocking teeth. Power and drainage connection between all panels is necessary as well, and power and drain ports must be provided to pass power from the first panel 4 and to allow all melted ice and snow to drain back to the first panel 4.

A number of weights may be installed within the panels 16 keep the panels in place. These may also serve as support elements, or additional support elements may be located within the platforms.

An optional ramp could be placed adjacent to the bottom row of panels (e.g. the first 4, third 8, and fifth 12 panels). This ramp would allow a vehicle to drive up onto the panels from the street. The drain hose 32 ideally runs along a curb to a drain installed in the street. This helps to prevent ice from forming on the street.

III. Alternative Embodiment Heated Surface System 102

Figure 11:
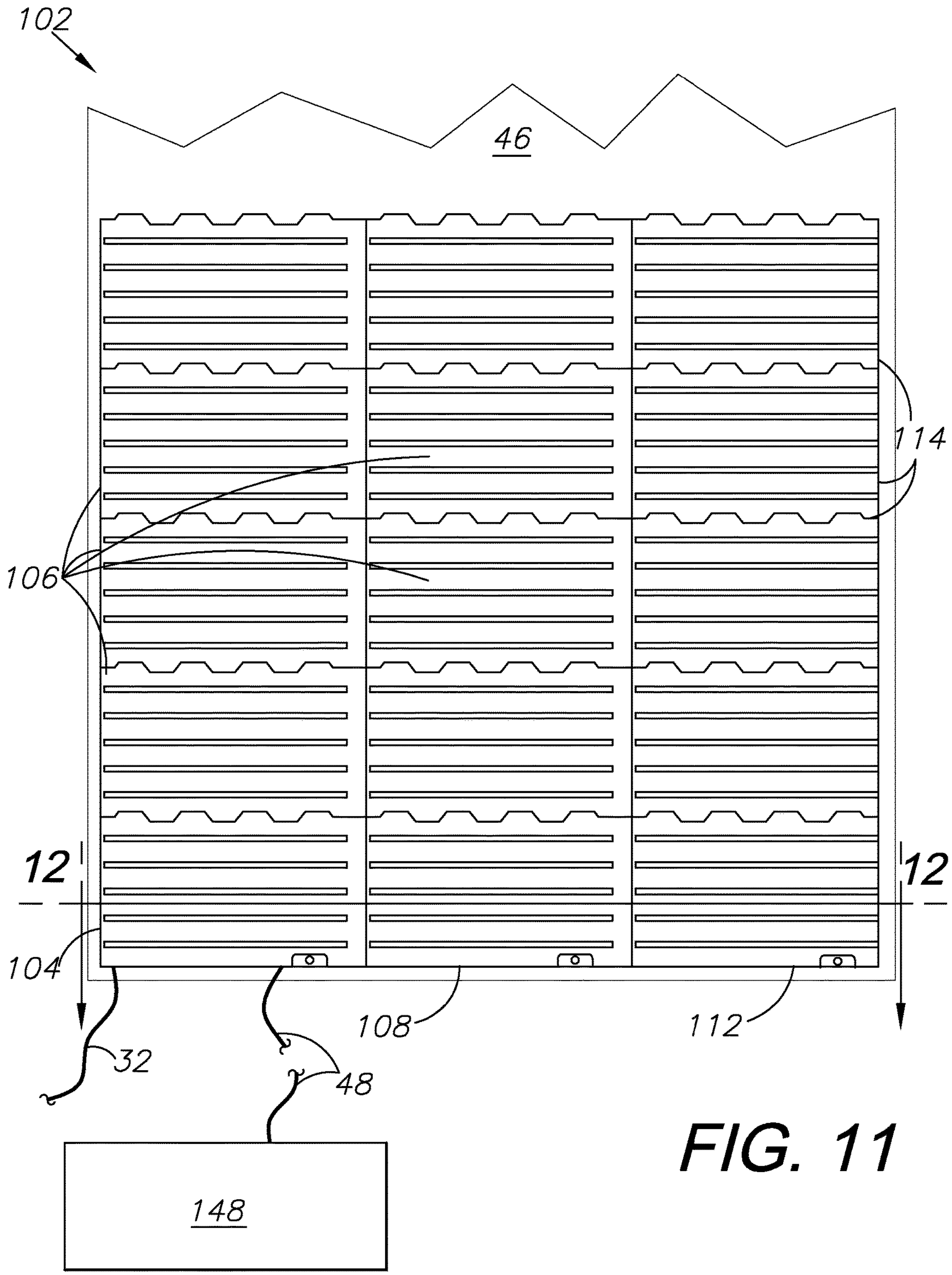
FIG. 11 is a top plan view of an alternative embodiment of the present invention.
Figure 12:
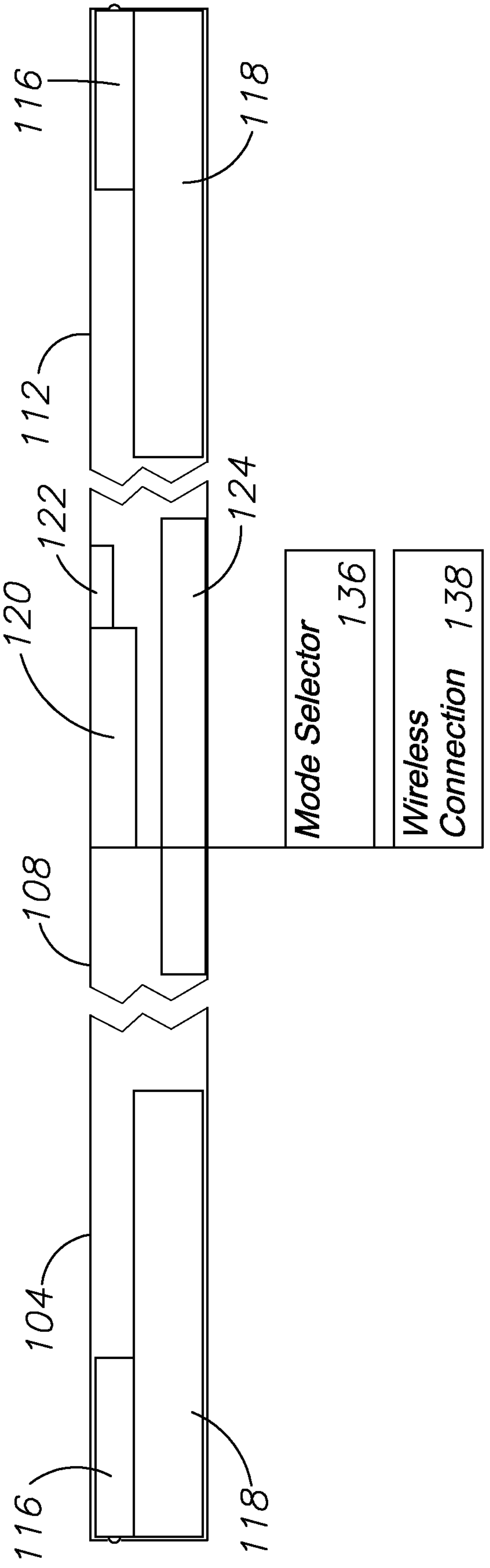
FIG. 12 is a sectional view thereof taken about the line of FIG. 11.
Figure 13:
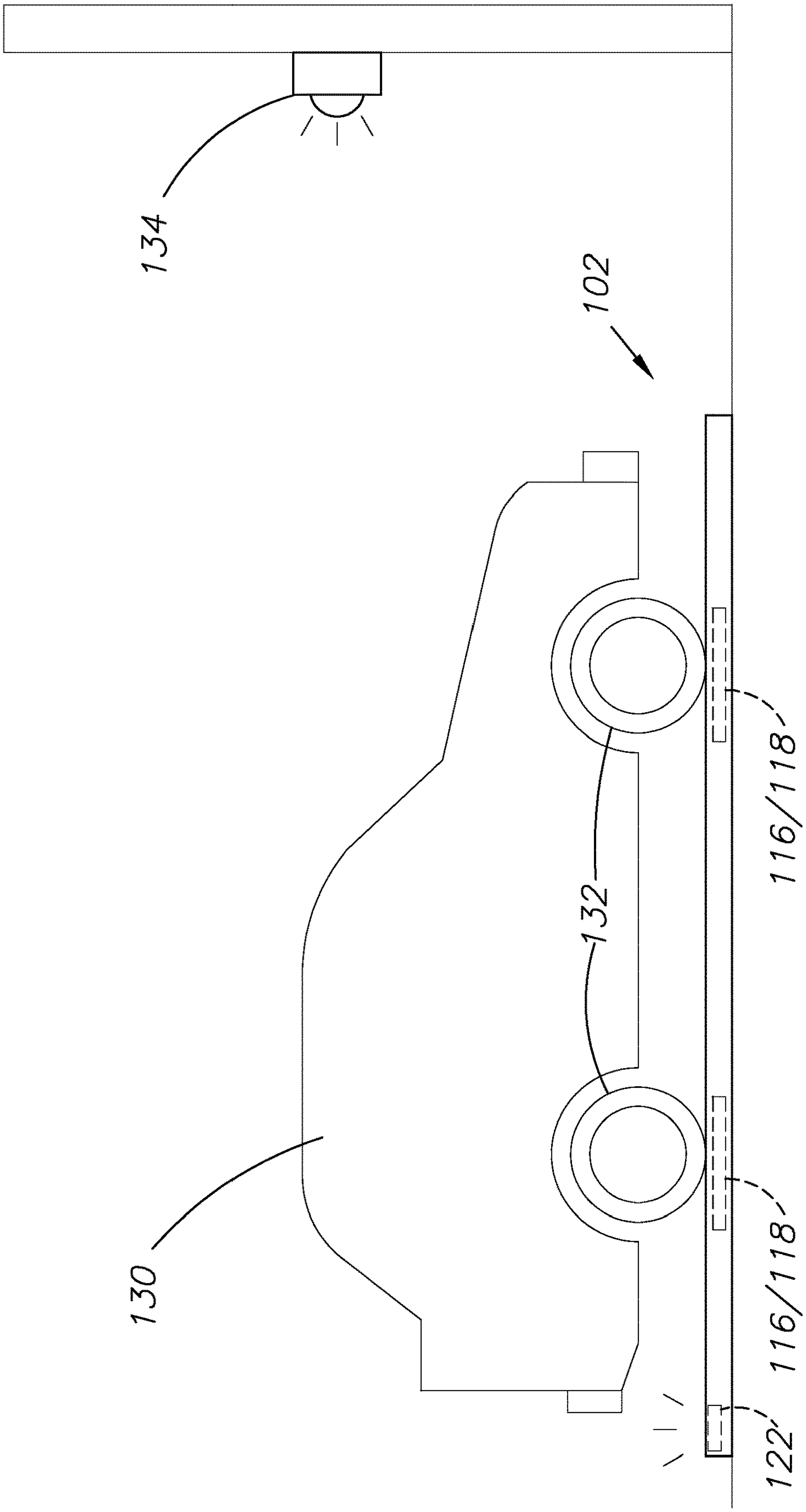
FIG. 13 is a side elevational view thereof shown in a typical environment with an automobile.

As shown in FIGS. 11-13, an alternative embodiment heated surface system 102 employ substantially the same panels as in the embodiment above. This embodiment employs sensors 116 and/or pressure plates 118 connected to an indicator 134 and/or a speaker 122 which indicates when the user's automobile 130 is parked on top of the heated surface panels. These panels 104, 106, 108, 110, 112, 114 function substantially the same as the panels 4, 6, 8, 10, 12, 14 above. The connection to power 48 may be connected to one or more solar panels 148 which can be used to provide active power to heat the panels, or passive power to charge a battery 124. The battery may be stored within one of the panels or external to the panels in another connected device.

As shown in FIG. 12, some of the panels may include sensors 116 and/or pressure plates which detect when the automobile 130 is parked correctly on the heated surface system 102. The example shown includes these elements within panels 104 and 112, however other panels could include these elements and could be selectively placed by the user to customize their heated surface system 102. The sensors 116 may be visual sensors, pressure sensors, or other suitable sensors for detecting when the vehicle 130 is in a desired location.

A computer 120 may be included within one of the panels 108 or stored elsewhere and connected (wired or wirelessly) to the heated surface system 102. The computer controls the heated surface system 102 and can turn it on based upon a predetermined schedule. A mode selector 136 allows the user to select what type of vehicle is being parked atop the heated surface system 102, such as a car, a truck, or a motorcycle. This can help the sensors 116 and/or pressure plates 118 compensate to more accurately detect when the vehicle is parked atop the heated surface system.

The computer can be connected to an indicator 134 and speaker 122, either through a wired connection or a wireless network connection 138. The speaker 122 would produce a sound when the vehicle 130 tires 132 are parked atop the heated surface system properly. Similarly, the indicator 134 can flash or light up when the vehicle is correctly parked. This allows the user to park with confidence on top of the heated surface system.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A modular surface heating system comprising:

a plurality of modular heating panels, each comprising a top face, a bottom face, an upper edge, a lower edge, a right-side edge, and a left side edge;

said plurality of modular heating panels configured to be combined to form a rectangular surface placed atop an exterior paved surface;

each of said plurality of modular heating panels including internal heat coils configured to heat each respective modular heating panel such that snow and ice located on each respective top face is melted into water;

each of said plurality of modular heating panels further including channels for receiving said water;

each of said plurality of modular heating panels including a respective internal drain line within each of said plurality of modular heating panels, said respective internal drain line connected to said respective channels of each of said plurality of modular heating panels, and wherein said respective internal drain line of each of said plurality of modular heating panels is configured to connect to an adjacent internal drain line of an adjacent one of said plurality of modular heating panels;

one of said plurality of modular heating panels having a spout for connecting an external drainage hose for draining said water from said respective internal drain line of each of said plurality of modular heating panels, said external drainage hose being selectively removable;

each of said plurality of modular heating panels including interlocking teeth and connection receivers for connecting to an adjacent one of said plurality of modular heating panels for draining said water away from each respective modular heating panel to said spout;

said interlocking teeth and connection receivers comprise a plurality of tabs located on respective bottom faces of said interlocking teeth, each of said plurality of tabs configured to be received by a respective connection receiver;

an outlet port for receiving heat power from an external source connected to one of said plurality of modular heating panels;

each of said plurality of modular heating panels including connections to connect an adjacent one of said plurality of modular heating panels to for receiving said heat power;

said heat power configured to heat said heating coils;

at least one of said plurality of modular heating panels including a sensor configured for detecting a presence of a vehicle located on top of said at least one of said plurality of modular heating panels; and said sensor connected to an indicator configured to indicate said presence of said vehicle located on top of said at least one of said plurality of modular heating panels.

2. The modular surface heating system of claim 1, wherein said heat power comprises electricity and said external source is an external electrical power source.

3. The modular surface heating system of claim 1, further comprising:

one of said plurality of modular heating panels including a cable lock receiver;

a cable having a first end connected to said cable lock receiver and a second end connected to a stationary object; and whereby said cable is configured to secure said rectangular surface.

4. The modular surface heating system of claim 1, further comprising:

each of said plurality of modular heating panels including at least one connecting edge; and said connecting edge comprised of alternating upper and lower connection teeth corresponding with alternating upper and lower connection teeth of an adjacent one of said plurality of heating modular panels.

5. The modular surface heating system of claim 1, further comprising:

each of said plurality of modular heating panels including at least one connecting edge;

said connecting edge comprised an upper lip having connecting nodules; and whereby said upper lip is configured to connect with an adjacent one of said plurality of modular heating panels comprising a lower lip having connecting receivers for receiving said connecting nodules of said first panel upper lip.

6. The modular surface heating system of claim 1, wherein said sensor comprises a pressure sensor.

7. The modular surface heating system of claim 1, wherein said sensor comprises an optical sensor.

8. The modular surface heating system of claim 1, further comprising a computer communicatively connected to said plurality of modular heating panels, said sensor, and said indicator.

9. The modular surface heating system of claim 1, wherein said indicator comprises a speaker configured to emit a sound.

10. The modular surface heating system of claim 1, wherein said external source comprises a solar panel.

11. The modular surface heating system of claim 8, wherein said indicator comprises a light.

12. The modular surface heating system of claim 1, wherein said computer comprising a mode selector configured to adjust said sensor based upon said vehicle's type.

* * * * *